United States Patent
Stein et al.

[11] Patent Number: 6,081,728
[45] Date of Patent: *Jun. 27, 2000

[54] STRIP-TYPE RADIATING CABLE FOR A RADIO COMMUNICATION SYSTEM

[75] Inventors: Richard B. Stein, Princeton; Wesley R. Paxman, Richardson, both of Tex.; Henry G. Ryman, Orland Park, Ill.

[73] Assignee: Andrew Corporation, Orland Park, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,303

[22] Filed: Feb. 28, 1997

[51] Int. Cl.⁷ ....................................................... H04B 7/00
[52] U.S. Cl. ................................. 455/523; 455/9; 455/14
[58] Field of Search ..................... 333/237, 238, 333/246; 455/9, 11.1, 7, 523, 14, 517

[56] References Cited

U.S. PATENT DOCUMENTS

| | | | |
|---|---|---|---|
| 2,800,634 | 7/1957 | Grieg et al. | 333/238 |
| 2,812,501 | 11/1957 | Sommers | 333/238 |
| 3,093,805 | 6/1963 | Osifchin et al. | 333/238 X |
| 3,519,962 | 7/1970 | Lind | 333/238 X |
| 3,803,366 | 4/1974 | Ishii et al. | 455/523 |
| 3,832,716 | 8/1974 | Plunk | 343/846 |
| 3,835,421 | 9/1974 | DeBrecht et al. | 333/246 X |
| 3,896,380 | 7/1975 | Martin | 455/523 |
| 3,916,311 | 10/1975 | Martin et al. | 455/523 |
| 4,012,662 | 3/1977 | Martin | 455/523 |
| 4,045,750 | 8/1977 | Marshall | 333/238 X |
| 4,063,246 | 12/1977 | Greiser | 343/700 |
| 4,280,225 | 7/1981 | Willis | 455/55 |
| 4,329,689 | 5/1982 | Yee | 343/700 |
| 4,339,733 | 7/1982 | Smith | 333/237 |
| 4,476,574 | 10/1984 | Struven | 455/55 |
| 4,616,413 | 10/1986 | Iliou et al. | 333/246 X |
| 4,660,007 | 4/1987 | Edwards et al. | 333/237 |
| 4,800,351 | 1/1989 | Rampalli | 333/237 |
| 4,866,732 | 9/1989 | Carey et al. | 455/55 |
| 4,970,525 | 11/1990 | Rohret et al. | 343/781 R |
| 5,005,183 | 4/1991 | Carey et al. | 375/1 |
| 5,034,997 | 7/1991 | Iwasaki | 455/617 |
| 5,061,943 | 10/1991 | Rammos | 343/770 |
| 5,189,432 | 2/1993 | Lombarbardi et al. | 343/739 |
| 5,296,651 | 3/1994 | Gurrie et al. | 333/246 X |
| 5,519,408 | 5/1996 | Schnetzer | 343/767 |

FOREIGN PATENT DOCUMENTS 1-58131  3/1991  Japan .

OTHER PUBLICATIONS

"Microstrip Lines and Slotines", Gupta, et al., Chapter 7.

*Primary Examiner*—Nguyen Vo
*Assistant Examiner*—Darnell R. Armstrong
*Attorney, Agent, or Firm*—Arnold White & Durkee

[57] ABSTRACT

A distributed strip-type radiating cable comprised of a plurality of generally flat conductive strips disposed in substantially parallel relationship to one or more generally flat dielectric materials, adapted to radiate RF energy for communications applications. The radiating cable is designed to be efficiently and inexpensively manufactured and installed from lightweight, small size materials, and is designed to be easily attached and secured to a variety of surfaces.

16 Claims, 3 Drawing Sheets

STRIP-TYPE RADIATING CABLE FOR A RADIO COMMUNICATION SYSTEM

FIELD OF THE INVENTION

The present invention relates generally to the field of radiating cables and, more particularly, to flat, strip-type transmission line cables adapted to radiate electromagnetic energy for communications applications.

BACKGROUND OF THE INVENTION

Heretofore, radiating cables have primarily consisted of "leaky" coaxial cables having inner and outer conductors separated by a dielectric material, in which the outer conductor is provided with either a continuous slot or a row of apertures extending lengthwise along the cable. In cables including a row of apertures, many apertures are typically provided per wavelength in order to physically approximate a continuous slot. In either case, the slot or apertures serve to couple electromagnetic signals radiating within the cable to fields radiating outside of the cable, such that the cable may be used as a distributed antenna for transmitting or receiving electromagnetic energy. Such radiating coaxial cables have proven to be useful for a wide variety of communications applications. However, radiating coaxial cables are relatively expensive to manufacture and install, due to their mechanical complexity and round, stiff structure. Accordingly, there is a need for an alternative type of radiating cable that may be used as a distributed antenna for transmitting or receiving electromagnetic energy, but which may be more inexpensively manufactured and installed than radiating coaxial cables. The present invention is directed to addressing this need.

SUMMARY OF THE INVENTION

It is a primary object of the invention to provide a radiating transmission line cable comprised of a plurality of flat conductive strips disposed in parallel relationship to one or more flat dielectric materials.

It is another object of this invention is to provide such a radiating transmission line cable supporting a broadband radiation pattern adapted for radio communications applications.

A further object of this invention is to provide such a radiating transmission line cable which can be efficiently and inexpensively manufactured and installed.

Still another object of this invention is to provide such a radiating transmission line cable from materials having little weight and a relatively small size.

A still further object of this invention is to provide such a radiating transmission line cable which may be easily attached and secured to a variety of surfaces.

Other objects and advantages of the invention will be apparent from the following detailed description and the accompanying drawings.

BRIEF DESCRIPTION OF THE DRAWINGS

The foregoing and other advantages of the invention will become apparent upon reading the following detailed description and upon reference to the drawings in which.

Figure 1:
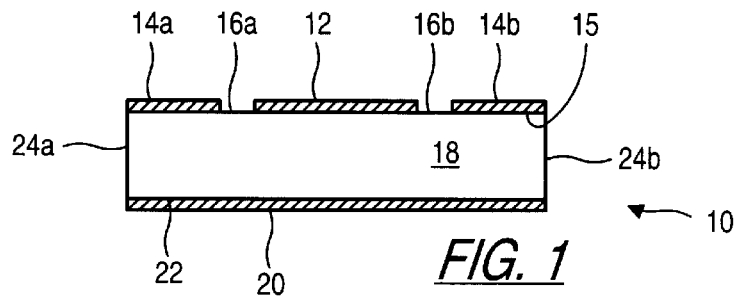
FIG. 1 is an end view of a coplanar transmission line cable with a ground plane according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, there is shown a coplanar transmission line cable with a ground plane, generally designated by reference numeral 10. The cable 10 is comprised of a center strip conductor 12 and two outer strip conductors 14a and 14b disposed on a first side 15 of a generally planar inner dielectric 18. The center strip conductor has a width $w_c$ and is separated from the outer strip conductors 14a, 14b by respective gaps 16a, 16b each having a width $w_g$. The inner dielectric 18 has a thickness t. A ground plane 20 is disposed on a second side 22 of the inner dielectric 18, separated from the center strip conductor 12 and two outer strip conductors 14a, 14b by the thickness t of the inner dielectric. Alternatively, the outer strip conductors 14a, 14b and ground plane 20 may be physically connected, either at the outside edges 24a, 24b or through the inner dielectric 18 of the cable 10.

In a preferred embodiment, the center strip conductor 12, two outer strip conductors 14a, 14b and ground plane 20 are each comprised of a thin strip of smooth or corrugated conducting material such as copper, aluminum or copper-clad aluminum foil, while the inner dielectric 18 is comprised of low-loss foam dielectric material such as cellular polyethylene or the like. In a preferred embodiment, the inner dielectric 18 is comprised of closed-cell non-cross-linked polyethylene having a dielectric constant of about 1.1. Nevertheless, it will be appreciated that the composition of the cable 10 may consist of any of several alternative conductive or dielectric materials known in the art.

One application for which the cable 10 of the present invention has been found to be particularly suitable is for RF communications within buildings, wherein appropriate placement of the cable 10 within the building is designed to provide substantially complete communications coverage throughout the building. In this application, it is preferred that the width $w_c$ of the center strip conductor 12 is about 0.5 inches, the width $w_g$ of the gaps 16a, 16b is about 0.06 inches, the width of the ground plane 20 is about one inch and the inner dielectric has a thickness of about one-eighth of an inch. Such composition and structure enables the cable 10 to be easily attached and concealed within the infrastructure of the building such as, for example, on the "T" frame typically used to support ceiling tiles within a commercial building. Nevertheless, it will be appreciated that the dimensions of the cable may be varied to suit the particular needs of the user.

The cable 10 may be excited by introducing an electrical signal between the center strip conductor 12 and the two outer strip conductors 14a, 14b. For example, the cable 10 may be excited by a coaxial cable having its inner conductor electrically connected to the center strip conductor 12 and its outer sheath electrically connected to the outer strip conductors 14a, 14b. According to one embodiment of the present invention, this is achieved by means of the coupling structure shown in FIG. 6, which will be described hereinafter. Being a non-tuned structure, the frequency range of the coplanar cable 10 is from below 10 MHz to above 2 GHz.

After excitation of the cable 10, it propagates a TEM mode throughout its length, radiating (or receiving) energy through the gaps 16a, 16b and at the outer edges of the inner dielectric 18. The near-field pattern of the coplanar cable 10 contains both co-polar (i.e., transverse or perpendicular to the cable) and cross-polar (i.e., axial or parallel to the cable) components of electric field. One contribution to the co-polar (perpendicular) component is produced via displacement currents across the two gaps 16a, 16b. A maximum value of this co-polar component occurs in the plane of the strip and a minimum value occurs directly above the strip. A second, typically smaller, contribution to the perpendicular component is produced via displacement currents between the two outer strip conductors 14a, 14b and the ground plane 20. A maximum value of this component also occurs in the plane of the strip. The contribution to the cross-polar (parallel) component is produced by a multiple "two-wire line effect" (hereinafter "TWLE"), where the center strip conductor 12 forms a line carrying a forward conduction current and the two outer strip conductors 14a, 14b and ground plane 20 each form associated return lines. The outgoing and return currents on these lines produce a standing wave of current along the outside of the cable traveling at a velocity dependent on the dielectric constant between the lines. This standing wave produces a radiated oscillatory field about the cable.

All of the above currents (conduction or displacement) combine to produce slow forward-traveling waves along the strip, thus producing an oscillatory near field about the strip. However, if mismatches or kinks occur in the cable, slow backward-traveling waves will be produced, typically having a smaller magnitude than the forward-travelling waves. The superposition of the two waves thereby will result in a forward-travelling wave having a relatively high degree of oscillation. Still further sources of oscillation (and associated radiation) may be caused by TWLE caused through coupling of the cable to nearby walls, and/or reflected fields from the walls, floors or ceiling.

The length of the cable 10 may be varied to suit the dimensions of the building or structure within which communications coverage is desired, so long as the length of the cable 10 is selected such the radiated signal is radiated with adequate strength along its entire length. As will be appreciated by those skilled in the art, attenuation of the signal along the cable will increase in proportion to the length of the cable. Thus, at relatively long lengths of cable, a relatively high level of input power is supplied to the cable so that the radiated signal at the end of the cable is not reduced to an unacceptable level.

The radiation performance of the coplanar cable 10 may be defined in terms of its insertion loss, return loss and radiating efficiency, each having a theoretical value which may be derived using techniques known in the art. The amount of radiation or loss from the cable is a function of the width of the center strip conductor 12, width of the gaps 16a, 16b, the dielectric constant and thickness of the inner dielectric 18, and the frequency of operation of the cable. With the materials and dimensions shown above for the building communications application, experimental data has shown the cable 10 to have an insertion loss of 6 to 8 dB per 100 feet at a frequency of 1 (GHz and a coupling loss to a dipole of 68 dB (50% data).

To facilitate ease of installation, the cable 10 may be provided with an adhesive strip of tape or glue of a type commonly known in the art on one or both of the two sides 15, 22 of the cable so that it may be easily adhered to a "T" frame structure or other suitable building structure. Moreover, inasmuch as the cable 10 is comprised of flexible foam and thin copper foil, it may be easily conformed to a variety of surfaces including, for example, sharp edges and/or corners of the building structure. Thus, although the cable 10 is described herein as a coplanar transmission line, it will be appreciated that either of the respective conducting strips may become non-planar, or non-coplanar, as a result of conforming to a particular building surface without significantly altering the performance characteristics of the cable.

Another application for which the coplanar transmission line cable 10 is envisioned is to provide communications coverage within tunnels. In such an embodiment, the cable 10 may be composed of more durable materials than in the building application to enable the cable 10 to withstand the relatively harsh environmental conditions within the tunnel. Moreover, the dimensions of the cable must be appropriately selected to match the desired performance characteristics within the tunnel. For example, in a tunnel application, the cable 10 may be expected to have a relatively long length corresponding to the length of the tunnel. Thus, other than in short-length tunnels, a cable designed for operation in relatively short lengths will not work effectively in a tunnel. Consequently, in a tunnel application, the operating parameters and/or dimensions of the cable 10 must be appropriately changed to allow operation at longer lengths. This may be achieved, for example, by operating at very low frequencies, increasing the width of the conductors, and/or increasing the thickness of the dielectric, either of which will generally decrease the loss characteristics of the cable 10.

Figure 2:
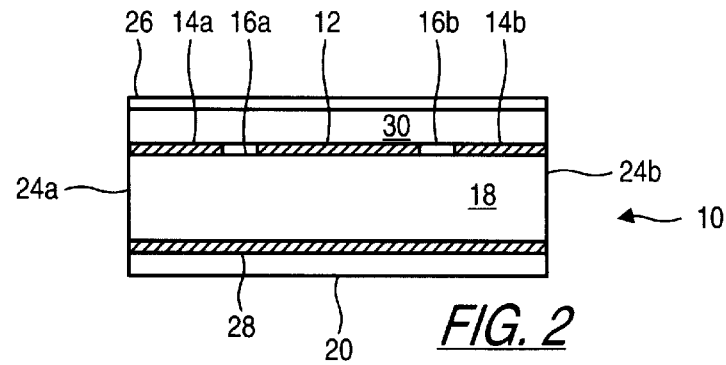
FIG. 2 is an end view of the coplanar transmission line cable of FIG. 1 including an external covering.

It will be appreciated that several modifications may be made to the cable 10 shown in FIG. 1 without significantly altering the performance characteristics. For example, as shown in FIG. 2, the cable 10 of FIG. 1 may be provided with an outer covering comprising a first outer dielectric material 26 disposed over the center strip conductor 12 and two outer strip conductors 14a and 14b and a second outer dielectric material 28 disposed over the ground plane 20. The first and second outer dielectrics 26, 28 preferably comprise materials having a low loss tangent so as to not significantly alter the performance characteristics from the structure of FIG. 1. Nevertheless, if it is necessary or desired to achieve similar performance characteristics using first and second outer dielectrics with significant loss tangents, an air gap or second inner dielectric 30 may be disposed between the center conductor 12 and first outer dielectric 26, as shown in FIG. 2. The second inner dielectric 30 need not be composed of the same material as the "first" inner dielectric 18.

Figure 3:
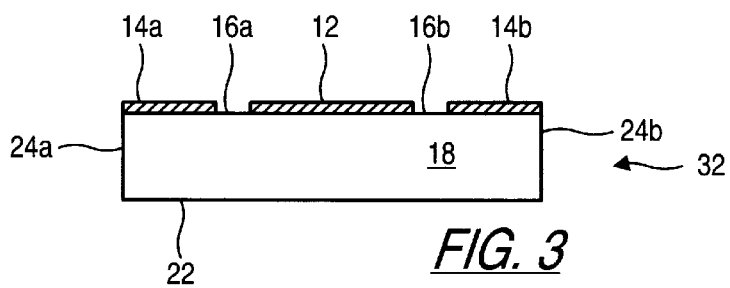
FIG. 3 is an end view of the coplanar transmission line cable of FIG. 1 without a ground plane.

FIG. 3 shows the coplanar transmission line cable of FIG. 1 in an embodiment without a ground plane, designated by reference numeral 32. With the materials and dimensions being the same as in FIG. 1, the cable 32 of FIG. 3 has substantially similar performance characteristics if mounted to an external conductive surface. In the cable of FIG. 3, the conductive surface (not shown) thus serves essentially the same function as the ground plane 20 in the cable of FIG. 1. The conductive surface may comprise, for example, an aluminum "T" frame such as that typically used to support ceiling tiles within a building.

Figure 4:
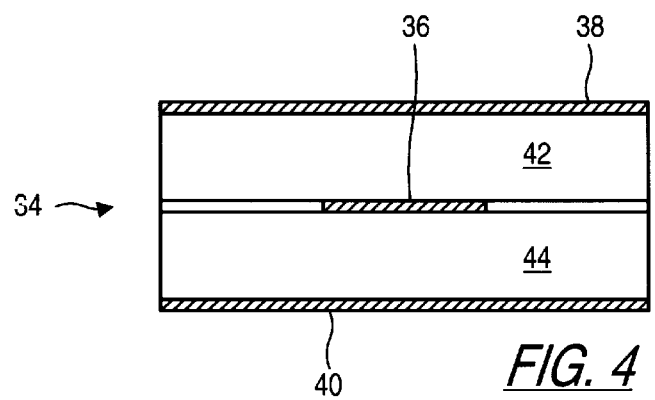
FIG. 4 is an end view of a symmetrical stripline transmission line cable according to one embodiment of the present invention.

FIG. 4 shows a symmetrical stripline transmission line cable which may be utilized in a communications system according to principles of the present invention. The symmetrical stripline transmission line cable (hereinafter "stripline"), generally designated by reference numeral 34, is comprised of a center strip conductor 36 sandwiched between two inner dielectrics 42 and 44, which in turn are surrounded by two outer layers 38, 40 of conductive material. If desired, the outer layers 38, 40 may be physically connected, either at the outside edges or through the inner dielectrics 42, 44 of the stripline cable 34.

The stripline 34 may be excited by introducing electromagnetic energy between the center strip conductor 36 and the two outer conductive layers 38, 40. For example, the stripline 34 may be excited by a coaxial cable having its inner conductor electrically connected to the center strip conductor 36 and its outer sheath electrically connected to the outer conductive layers 38, 40.

After excitation of the stripline 34, the stripline 34 propagates a TEM mode throughout its length, radiating (or receiving) energy through the gaps 39a, 39b formed on the outside edges of the center strip conductor 36 between the two inner dielectrics 42, 44. For the stripline cable 34, the amount of radiation or loss is a function of the width of the center strip conductor 36 and the dielectric constant and thickness of the inner dielectrics 42, 44. With the composition and dimensions of the components of the stripline 34 equivalent to the respective components of the coplanar cable 10 of FIG. 1, the stripline 34 may generally be expected to radiate more than the coplanar cable 10 of FIG. 1. Nevertheless, the composition or dimensions of the stripline cable 34 may be varied to support any of several applications and/or operating environments.

Figure 5:
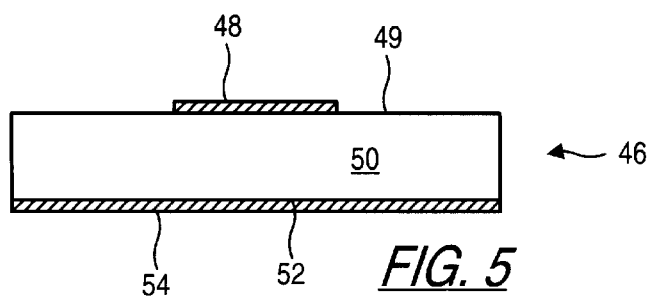
FIG. 5 is an end view of a microstrip transmission line cable according to one embodiment of the present invention.

Now turning to FIG. 5, there is depicted a microstrip transmission line cable, generally designated by reference numeral 46, which may be utilized in a communications system according to principles of the present invention. The microstrip cable 46 is comprised of a center strip conductor 48 disposed on one side 49 of an inner dielectric 50 with a ground plane 54 disposed on the other side 52 of the inner dielectric 50.

The microstrip cable 46 may be excited by introducing electromagnetic energy between the center strip conductor 48 and the ground plane 54. For examples, the microstrip cable 46 may be excited by a coaxial cable having its inner conductor electrically connected to the center strip conductor 48 and its outer sheath electrically connected to the ground plane 54. In a preferred embodiment, the composition and dimensions of the center strip conductor 48, inner dielectric 50 and ground plane 54 are comparable to that of the coplanar cable 10 of FIG. 1, but it will be appreciated that the composition or dimensions of the stripline cable 34 may be varied to support any of several applications and/or operating environments.

After excitation of the microstrip cable 46, it propagates a TEM mode throughout its length, radiating (or receiving) energy through the gaps 55a, 55b formed outside and adjacent to the center strip conductor 48 above the inner dielectric 50. For the microstrip cable 46, the amount of radiation or loss is a function of the width of the center strip conductor 48 and the dielectric constant and thickness of the inner dielectric 50. The composition and dimensions of the components of the microstrip cable 46 are equivalent to the respective components of the coplanar cable of FIG. 1. It will be appreciated that the composition or dimensions of the microstrip cable 46 may be varied to support any of several applications and/or operating environments.

Figure 6:
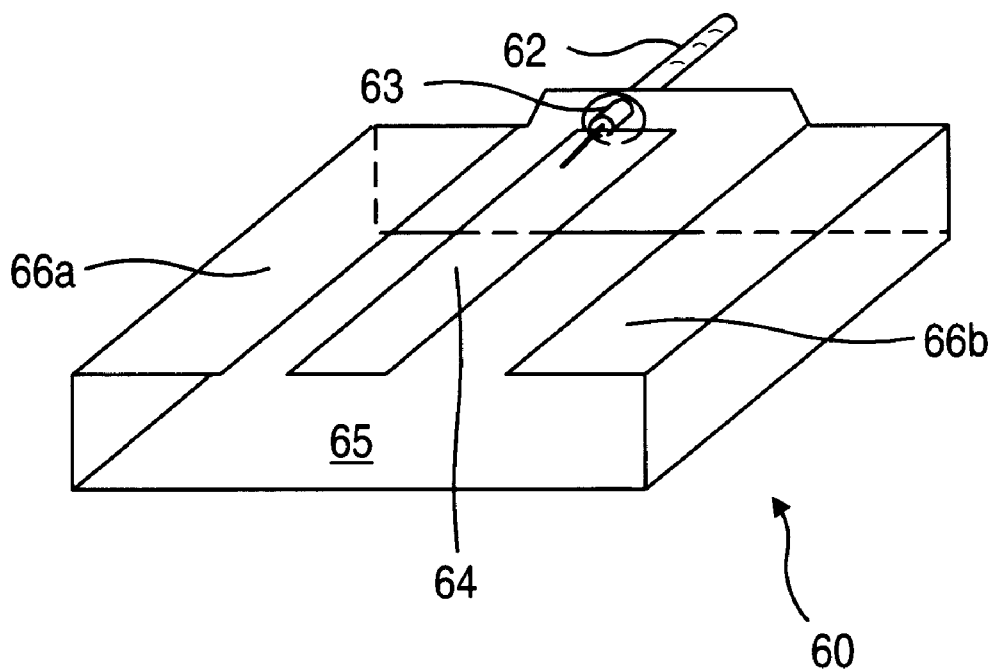
FIG. 6 is a perspective view of a slip-on connector which may be used to introduce electrical signals to the cables of FIGS. 1, 3 or 5.

FIG. 6 illustrates a slip-on connector 60 which may be used as an interface between the coplanar cable 10 (not shown in FIG. 6) and coaxial cable 62 equipped with a standard SMA female connector 63. The inner and outer conductors of the coaxial cable 62 are respectively connected to a tongue conductor 64 and an outer conductive sheath 65. The sheath 65 includes to respective upper flanges 66a, 66b extending upwardly and folded inwardly from the bottom planar surface of the sheath 65. In one embodiment, the tongue conductor 64 and outer sheath 65 are each comprised of brass having a thickness of about 0.010 to 0.015 inches, but it will be appreciated that alternative conductive materials and/or thicknesses may be selected. When the connector 60 is slipped over the coplanar cable 10, the tongue conductor 64 becomes electrically connected to the center strip conductor 12 of the coplanar cable 10, the base portion of the outer sheath 65 becomes electrically connected to the ground plane 20, and the upper edges 66a, 66b of the sheath become electrically connected to the respective outer conductors 14a, 14b of the coplanar cable.

Although the connector 60 shown in FIG. 6 is designed for use with the coplanar cable 10 of FIG. 1, it will be appreciated that it may similarly be used with the coplanar cable without a ground plane (FIG. 3), the microstrip line (FIG. 5) or any other embodiment including a center strip conductor on an upper surface of flat cable.

Figure 7:
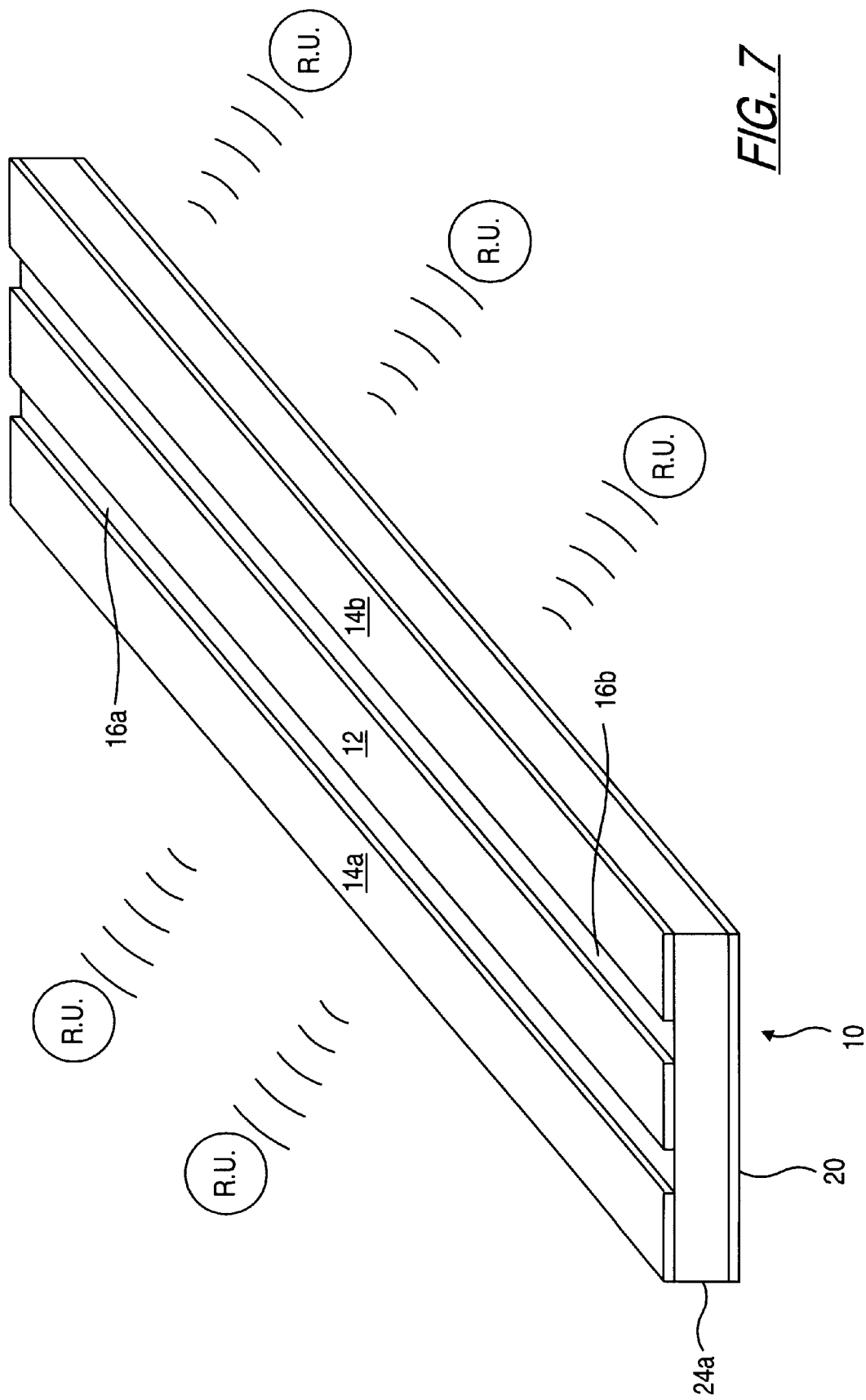
FIG. 7 is a perspective view of the coplanar transmission line cable 10 of FIG. 1 in a radio communications application.

FIG. 7 illustrates a length L of the coplanar transmission line cable 10 of FIG. 1 in a radio communications application. For purposes of the present application, however, it will be appreciated that either of several alternative types of flat transmission line cables may be utilized for radio communications applications, including those shown in FIGS. 2 through 5, or slotline transmission lines or coplanar strip transmission lines. When a radio frequency signal is applied between the center strip conductor 12 and outer strip conductors 14a, 14b at one end of the cable, it is propagated toward the other end of the cable. One portion of the signal is radiated from the slots 16a, 16b, and another portion of the signal is radiated from the outer edges 24a, 24b along the entire length of the cable 10. The radiated field can be detected by radio units (designated "R.U." in FIG. 7) positioned anywhere along the length of the cable 10. The cable 10 can also receive radiated signals from the radio units R.U. anywhere along its length. The radiated field, although oscillatory, has a broadband characteristic similar to that of RADIAX™ cable.

The radiating cable 10 may be used in a wide variety of different applications where individual or multiple radio units must communicate with one or more base stations within a defined area. One example of such a system is a network of cellular telephones, each equipped with a radio unit and located in a common building or common floor. Another example is a wireless local area network (WLAN) of personal computers, printers, servers and the like, each equipped with a radio unit and located in a common building or a common floor. Still another example is a highway, railroad or subway communications system in which the radiating cable is mounted within a tunnel or open stretch of highway, railroad or subway, with mobile radio units in the various vehicles traveling along the highway, railroad or subway.

There are several advantages associated with the present invention over radiating coaxial cables, one of which is its relative ease of manufacture and associated lower costs. In the embodiment shown in FIG. 1, the coplanar cable 10 may be manufactured by simply rolling a precut dielectric onto a strip of copper foil, then rolling three copper strips on top of the dielectric. Conductive adhesives are typically used for attaching each respective element of the coplanar cable 10. The structure can then be coated with a wrapped, colored, low-loss tape or have an extruded jacket. In contrast, coaxial cables are typically produced through a relatively complex and expensive procedure involving the extrusion, taping or winding of a dielectric core around a center conductor, then helically winding, longitudinally pulling (cigarette-wrapping), braiding or extruding a radiating sheath over the dielectric core to form the necessary radiation apertures in the radiating sheath or otherwise milling the radiation apertures onto the radiating sheath. Additional dielectrics and/or radiating sheaths may be added by repeating the above process.

A further advantage of the present invention over radiating coaxial cables is its relative ease of installation, also resulting in lower costs. For example, either of the above-described embodiments may be installed by simply adhering one of the planar surfaces of the cable directly to a corresponding surface, such as the "T" frame used to support ceiling tiles within a commercial building. In a preferred embodiment, this is achieved through provision of an adhesive strip affixed to the ground plane (or dielectric, in the embodiment without a ground plane) of the cable. The cable may thereafter be installed by simply attaching the adhesive strip to the desired surface. Moreover, because of the flexibility of the cable, it may be easily conformed to a variety of surfaces, including non-planar surfaces, corners and the like. Additionally, the flat structure of the present invention enables it to be more easily concealed than coaxial cables and, if not concealed, it is generally considered to be more attractive than coaxial cables. In contrast, installation of radiating coaxial cables is a relatively difficult and more expensive process, inasmuch as coaxial cables typically may not be directly affixed to a desired surface nor conformed to a variety of surfaces.

If the mounting surface is conductive, it is preferred that the thickness of the adhesive strip be sufficiently thin so as to prevent coupling (e.g. two-wire line effect) and an associated oscillatory field produced between the ground plane and the mounting surface. If such coupling occurs, its effect will be to increase the insertion loss of the cable, which may be acceptable in short runs but unacceptable in longer runs. Of course, this problem will not arise in embodiments not including a ground plane.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of communicating among a multiplicity of radio units located within a prescribed space, said method comprising the steps of:

attaching an elongated distributed strip-type radiating cable to an elongated supporting surface within or adjacent to said prescribed space for transmitting radiated signals to, and receiving radiated signals from, said multiplicity of radio units along the length of the cable, via said cable, said strip-type radiating cable comprising
a thin, generally planar, elongated dielectric strip,
a strip conductor affixed to a first side of said elongated dielectric strip and extending longitudinally along the length of said dielectric strip, and
a ground plane affixed to a second side of said dielectric strip and extending longitudinally along the length of said dielectric strip;

coupling said cable to transmitting and receiving equipment so as to cause said cable to transmit radiated signals to, and receive radiated signals from, said radio units along the length of the cable; and receiving said radiated signals at said radio units and transmitting radiated signals from said radio units to said cable.

2. The method of claim 1 wherein said dielectric strip is a low-loss dielectric material.

3. The method of claim 1 wherein said prescribed space in which said radio units are located is a building, and said strip-type cable is attached to a supporting surface in said building.

4. The method of claim 3 wherein said strip-type cable is attached to a frame supporting ceiling tiles in said building.

5. The method of claim 1 wherein the width of said strip conductor and the dielectric constant and thickness of said dielectric strip are selected to produce a radiating field sufficient to communicate with said multiplicity of radio units along the entire length of said cable at the operating frequencies of said radio units.

6. The method of claim 1 wherein said strip-type cable is attached to said supporting surface with an adhesive coating on one side of said cable.

7. The method of claim 1 which includes, an outer layer of dielectric material covering both said strip conductor and said ground plane.

8. The method of claim 1 wherein said strip conductor extends along the center of said first side of said dielectric strip, and which includes a pair of outer strip conductors affixed to said first side of said dielectric strip on opposite sides of said center strip conductor and of substantially the same length as said center strip conductor.

9. A wireless communication system comprising
a multiplicity of radio units located within a prescribed space,
an elongated distributed strip-type radiating cable attached to an elongated supporting surface within or adjacent to said prescribed space for transmitting radiated signals to, and receiving radiated signals from, said multiplicity of radio units along the length of the cable, via said cable,
said strip-type radiating cable comprising
a thin, generally planar, elongated dielectric strip,
a strip conductor affixed to a first side of said elongated dielectric strip and extending longitudinally along the length of said dielectric strip, and
a ground plane affixed to a second side of said dielectric strip and extending longitudinally along the length of said dielectric strip;
means for coupling said cable to transmitting and receiving equipment so as to cause said cable to transmit radiated signals to, and receive radiated signals from, said radio units along the length of the cable.

10. The system of claim 9 wherein said dielectric strip is a low-loss dielectric material.

11. The system of claim 9 wherein said prescribed space in which said radio units are located is a building, and said strip-type cable is attached to a supporting surface in said building.

12. The system of claim 11 wherein said strip-type cable is attached to a frame supporting ceiling tiles in said building.

13. The system of claim 9 wherein the width of said strip conductor and the dielectric constant and thickness of said dielectric strip are selected to produce a radiating field sufficient to communicate with said multiplicity of radio units along the entire length of said cable at the operating frequencies of said radio units.

14. The system of claim 1 wherein said strip-type cable is attached to said supporting surface with an adhesive coating on one side of said cable.

15. The system of claim 9 wherein said cable includes, an outer layer of dielectric material covering both said strip conductor and said ground plane.

16. The system of claim 9 wherein said strip conductor extends along the center of said first side of said dielectric strip, and said cable includes a pair of outer strip conductors affixed to said first side of said dielectric strip on opposite sides of said center strip conductor and of substantially the same length as said center strip conductor.

* * * * *